United States Patent [19]

Howes et al.

[11] Patent Number: 4,687,595

[45] Date of Patent: Aug. 18, 1987

[54] PROCESS FOR PRODUCING CORROSION INHIBITING PARTICLES

[75] Inventors: Roger J. Howes, Camberley; David G. Othen, Bracknell, both of England

[73] Assignee: The British Petroleum Company, p.l.c., London, England

[21] Appl. No.: 739,022

[22] Filed: May 29, 1985

[30] Foreign Application Priority Data

Jun. 2, 1984 [GB] United Kingdom .................. 8414125

[51] Int. Cl.$^4$ ...................... C09D 5/08; C09K 15/02; C23F 11/18; C08K 9/00

[52] U.S. Cl. .................................. 252/387; 106/14.05; 106/14.25; 106/14.39; 106/287.34; 106/288 B; 106/309; 264/12; 264/345; 423/326; 423/331; 423/334; 523/200; 523/216; 524/403; 524/437; 524/443; 524/450; 524/456

[58] Field of Search ............... 106/14.05, 14.25, 14.39, 106/296, 297, 306, 309, 287.34, 286.2, 287.1; 252/389 R, 387; 423/331, 326, 334; 264/12, 345

[56] References Cited

U.S. PATENT DOCUMENTS

4,419,137 12/1983 Cayless et al. ...................... 524/436
4,459,155 7/1984 Cayless ............................... 106/14.25
4,474,607 10/1984 Goldie et al. ...................... 106/14.39

FOREIGN PATENT DOCUMENTS

0122781 10/1984 European Pat. Off. .

Primary Examiner—Herbert J. Lilling
Attorney, Agent, or Firm—Morgan & Finnegan

[57] ABSTRACT

A process for producing corrosion inhibiting particles comprising binding corrosion inhibiting cations by ion-exchange to particles of silica or alumina, which preferably have a BET surface area of at least 500 m$^2$/g, to form cation exchanged particles, the cations of which are releasable by further ion-exchange, the BET surface area of the cation-exchanged particles being reduced, preferably to less than 150 m$^2$/g, by subjecting the cation-exchanged particles to a heat treatment which comprises heating the particles at a temperature of from 50° to 120° C. while maintaining the water content of the particles at more than 15% by weight, followed by heating with removal of water to dry the particles. An embodiment of the invention comprises heating a slurry of the cation exchanged particles followed by drying e.g. spray drying.

10 Claims, No Drawings

PROCESS FOR PRODUCING CORROSION INHIBITING PARTICLES

The present invention relates to a process for producing corrosion inhibiting particles suitable for use in protective coatings, e.g. paints, to the corrosion inhibiting particles produced by the method and to coatings containing them.

Corrosion inhibitors comprising particles of an inorganic oxide having corrosion inhibiting cations chemically bound, by ion-exchange to the surface of the oxide particles are known. European Patent Application No. 0046 057 discloses corrosion inhibiting particles comprising an inorganic oxide, which is silica or alumina, having corrosion inhibiting cations chemically bound to the particles. The cations specifically disclosed are calcium, zinc, cobalt, lead, strontium, lithium, barium and magnesium cations. European Patent Application No. 0 089 810 discloses corrosion inhibitors comprising an inorganic oxide having cations of yttrium or cations of one or more metals of the lanthanide group chemically bound to the oxide particles.

The patent applications referred to above also disclose methods of preparing corrosion inhibitors comprising inorganic oxide particles having corrosion inhibiting cations bound to the surface of the oxide. These methods basically comprise contacting the inorganic oxide with a solution containing the required corrosion inhibiting ions and controlling the pH in order to effect the ion-exchange between the corrosion inhibiting cations and the hydroxyl groups which are present on the surface of the oxide. The cation-exchanged particles may then be washed, milled to a small particle size, if required, and dried. Published European patent application No. 0 122 781 also discloses a method of preparing corrosion inhibitors which method comprises reacting, with agitation, an aqueous suspension of silica or alumina particles, having an average particle diameter of less than 25 μm, with a source of corrosion inhibiting cations at a temperature at or below 15° C.

Preferably, the inorganic oxide used to prepare the corrosion inhibitors has a BET surface area greater than 100 $m^2/g$, more preferably greater than 250 $m^2/g$ and most preferably greater than 500 $m^2/g$.

The BET surface area is the surface area as determined by the method described by Brunauer, Emmett and Teller in J. Am. Chem. Soc., 60, 309 (1938).

The preferred relatively high surface area of the inorganic oxide assists the ion-exchange reaction. However, it has now been found that the corrosion inhibiting performance of certain of the corrosion inhibiting particles disclosed in the above applications is affected by the surface area of the particles.

The effect of the surface area on the corrosion inhibiting performance of the particles can be assessed by stirring a sample of the corrosion inhibiting particles in an aqueous solution of sodium chloride and measuring the proportion of the corrosion inhibiting cations released over a period of time. A high rate of release of the cations indicates that the particles would provide a relatively high degree of protection over a relatively short period of time whereas a low rate of release indicates that the particles would provide a somewhat lower degree of protection over a relatively long period of time. It would therefore be useful to be able to control the surface area of the corrosion inhibiting particles in order to optimise the corrosion inhibiting properties.

The ion-exchange reaction generally results in some reduction in the surface area of the inorganic oxide particles but a method has now been found which enables the surface area to be reduced by a further, controlled, amount. The method therefore enables the surface area of the corrosion inhibiting particles to be controlled.

According to the present invention a process for producing corrosion inhibiting particles comprising binding corrosion inhibiting cations by ion-exchange to particles of silica or alumina to form cation-exchanged particles, the cations of which are releaseable by further ion-exchange is characterised in that the BET surface area of the cation-exchanged particles is reduced by subjecting the cation-exchanged particles to a heat treatment which comprises heating the particles at a temperature of from 50° to 120° C. while maintaining the water content of the particles at more than 15% by weight, followed by heating with removal of water to dry the particles.

Preferably, the silica or alumina particles used to prepare the cation-exchanged particles have a BET surface area of at least 500 $m^2/g$ and the method according to the invention preferably reduces the BET surface area of the cation-exchanged particles to less than 150 $m^2/g$.

The heat treatment preferably comprises heating the cation-exchanged particles at a temperature of from 70° to 100° C., more preferably from 80° to 95° C.

The cation-exchanged particles may be prepared by any suitable process such as the processes described in the above mentioned patent applications. For example the cation-exchanged particles may be prepared by contacting silica or alumina particles having surface hydroxyl groups with a solution containing corrosion inhibiting cations and controlling the pH of the mixture in order to effect ion-exchange between the corrosion inhibiting cations and the hydroxyl groups. Alternatively, particles of silica or alumina having surface hydroxyl groups may be contacted with an aqueous solution of an alkali metal salt at a pH sufficiently above 7 for the protons of the hydroxyl groups to be replaced by alkali metal cations and thereafter contacting the alkali metal exchanged silica or alumina with a solution containing the required corrosion inhibiting cations in order to replace the alkali metal cations with the required corrosion inhibiting cations.

The methods disclosed in the above mentioned patent applications produce the cation-exchanged particles as slurries from which the water must be removed.

The heating of the cation-exchanged particles according to the method of the present invention must be carried out in the presence of more than 15% by weight of water. A slurry of the cation-exchanged particles contains a relatively large amount of water. Conveniently, therefore, the particles are heated when in the form of a slurry. However, the particles may also be subjected to the heat treatment according to the present invention after they have been separated from the bulk of the water in the slurry.

According to one embodiment of the invention the heat treatment, as hereinbefore defined is carried out on a slurry containing the cation-exchanged particles, the slurry is filtered and the filter cake dried in an oven. The filter cake may be washed one or more times before drying. According to a further embodiment of the invention, the heat treatment, as hereinbefore defined, is carried out on a filter cake. A filter cake typically contains 40 to 60% by weight of water as determined by measuring the loss in weight of a sample of the filter cake dried at 100° C. under a pressure of 0.5 atmospheres (50.7 kNm$^{-2}$) for 16 hours. The water content of the filter cake before heating may be sufficient to achieve the desired reduction in surface area by heating according to the method. More water can be introduced before or during the heating.

The process according to the invention may comprise heat treating a filter cake by heating in an oven without removal of water, or with controlled removal of water in order to maintain the water content of the cation-exchanged particles at more than 15% by weight, followed by drying the particles by heating in an oven with removal of water.

The final surface area of cation-exchanged particles prepared by this two stage process can be controlled by controlling the duration of the heat treatment stage.

Cation-exchanged particles which have already been dried may be subjected to the process according to the present invention in order to reduce their surface area provided that the particles are first re-wetted. It is wasteful of energy to dry and then re-introduce water and so the particles are preferably reduced to the desired surface area by the method according to the present invention before the drying of the particles.

The water content of the cation-exchanged particles before being heated according to the present invention should be more than 15% by weight as determined by measuring the loss in weight of a sample heated at 100° C. for 16 hours under a pressure of 0.5 atmospheres (50.7 kNm$^{-2}$). Preferably the particles are associated with a relatively large amount of water e.g. in excess of 30% by weight.

The period of time for which the cation-exchanged particles are subjected to heating according to the process of the present invention depends inter alia on the temperature at which the heating step is carried out, the amount of water present, the form of the particles e.g. the size of a filter cake, the subsequent drying step and the amount by which the BET surface area is to be reduced. The time required in any particular set of circumstances can be easily determined by trial and error experiments.

It has been found that there is little or no reduction in the BET surface area of cation-exchanged particles when they are dried very rapidly e.g. in a spray drier. The process according to the present invention is particularly suitable for use in combination with a rapid drying process. Preferably the heat treatment is carried out on the slurry before it is dried in, for example, a spray drier.

The period of time for which a slurry of the cation exchanged particles is subjected to heating according to the method of the present invention prior to rapid drying in, for example, a spray drier depends inter alia on the temperature at which the heating step is carried out and the amount by which the BET surface area is to be reduced. Since the heating is carried out on a slurry, the water content does not influence the duration of the heating required.

The BET surface area of the silica or alumina particles used to prepare the cation-exchanged particles is preferably at least 500 m$^2$g.

The process according to the invention has been found to be particularly useful for controlling the BET surface area of cation-exchanged silica particles.

Commercially available silicas suitable for use in the method of the present invention include the following:

| Silica | Mean Particle Size (μm) | Average Pore Diameter (A) | BET Surface Area (m$^2$/g) |
|---|---|---|---|
| British Ceca Co. Ltd Cecagel | 2000–1000 | 21 | 692 |
| Joseph Crosfield | | | |
| Gasil WPI | 12 | 33 | 1080 |
| Gasil 200 | 4.5 | 21 | 750 |
| Gasil GM2 | 10 | 21 | 750 |
| Sorbsil A | 250–125 | 21 | 720 |
| Grace Chemicals Syloid AL-1 | 8 | — | 780 |
| BDH Silica gel | 250–125 | — | 500 |

The corrosion inhibiting cations may be, for example, cations of calcium, zinc, cobalt, lead, strontium, lithium, barium, manganese or yttrium or one or more cations of the lanthanide series which comprises the metals having atomic numbers of from 57 to 71 inclusive.

The present invention includes corrosion inhibiting particles produced by the process as hereinbefore described. The process has been found to be particularly useful for preparing corrosion inhibiting particles comprising silica particles having calcium cations bound to the surface of the silica by ion-exchange. When such calcium-exchanged silica particles are used in certain protective coatings, e.g. alkyd paints, it has surprisingly been found that although the rate of release of the calcium ion decreases with decreasing BET surface area, the corrosion inhibiting properties increase with decreasing BET surface area. Preferably the BET surface area of calcium-exchanged silica particles for use in protective coatings is less than 100 m$^2$/g and is more preferably less than 50 m$^2$/g. The present invention provides a process for controlling the surface area of the particles in order to optimise the corrosion-inhibiting properties of the particles for any particular application.

The corrosion inhibiting particles prepared according to the method of the present invention may typically contain up to 2.5 millimoles/g of the corrosion inhibiting cation, depending inter alia, on the particular cation and the particular silica or alumina used. The lower limit of the amount of the corrosion inhibiting cation may be 0.01 millimoles/g but is preferably 0.05 millimoles/g.

The corrosion inhibiting particles prepared by the method as hereinbefore described may be included in protective coatings and the present invention includes protective coatings containing the corrosion inhibiting particles. The protective coatings may be any of the known types of protective coatings based on film forming polymers or resins e.g. paints, varnishes and lacquers. It may, in particular, be primer paints based on epoxy resins, vinyl resins, alkyd resins, chlorinated rubbers or cyclised rubbers.

The corrosion inhibiting particles may act as a filler for the coating and may be included in amounts of up to 40% wt based on the composition to be applied and up to 80% wt based on the dry film weight. Corrosion inhibiting properties may be imparted to the protective coatings by relatively small amounts of the corrosion inhibiting particles, e.g. 10% wt, depending on the corrosion inhibiting cation content of the corrosion inhibiting particles.

A general purpose metal primer may typically contain approximately 12% w/w of cation-exchanged silica corrosion inhibiting particles i.e. approximately 40% of the total pigment volume. Such a primer would have a corrosion inhibiting cation concentration in the dry film of approximately $1.2 \times 10^{-3}$ to $3 \times 10^{-1}$ millimoles/g.

When used in protective coatings the particles should be suitably small so as to remain in suspension in the composition before the application and so as not to substantially affect the ease of application or the smoothness of the dry coating. Suitably the particles are less than 40 microns in diameter, more preferably less than 25 microns. Thus particles having a small particle size can be ion-exchanged. Alternatively, larger particles can be ion-exchanged and then subsequently milled to a smaller size without adverse effect. The use of larger particles does not significantly reduce the total uptake of ions. The subsequent size reduction is conveniently carried out by wet grinding before drying the particles but grinding dried particles is also suitable. The size reduction step may be before or after the heat treatment.

The corrosion inhibiting particles act to release the corrosion inhibiting cations by ion exchange with an ion which exists in the environment in which the particles are used. Unlike coatings containing sparingly water soluble salts which act by the solubilisation of the corrosion inhibiting salts, the cations of corrosion inhibitors produced according to the present invention are preferentially released from the inorganic oxide in areas where the desired barrier properties of the coating are weakest.

The invention is illustrated by the following examples.

EXAMPLE 1

100 g of a silica gel having a BET surface area of 1080 m²/g (Gasil WPI ex Joseph Crosfield) was added to 200 cm³ of distilled water. Powdered calcium hydroxide was added over a period of 10 minutes to the silica/water slurry with stirring until the pH remained steady at 9.5. The pH was not allowed to rise above 10.5 during the addition of the calcium hydroxide. After 30 minutes of further stirring the mixture was filtered and washed with distilled water until the electrical conductivity of a slurry of the ion-exchanged particles was less than 1000μ ohm/cm. The cation-exchanged particles contained 5% by weight of calcium.

Half of the filter cake was dried in an oven at 90° C. for 16 hours under a pressure of 0.5 atmospheres (50.7 kNm⁻²). The partial vacuum ensured removal of water from the oven. The BET surface area of the dried particles was 260 m²/g.

The other half of the filter cake was heated in an oven at 90° C. and atmospheric pressure for 16 hours without removal of water from the oven followed by heating for a further 16 hours at 90° C. under a partial vacuum of 0.5 atmospheres to remove water. The BET surface area of the dried particles was 97 m²/g.

The results show that the BET surface area of the calcium exchanged silica particles can be further reduced to less than 150 m²/g by heating the wet particles at 90° C. without removal of water followed by drying the particles.

EXAMPLE 2

Example 1 was repeated except that the silica gel used was Syloid AL-1 ex Grace Chemicals. The silica initially had a BET surface area of 780 m²/g.

The calcium-exchanged silica which was heated without removal of water and then dried had a BET surface area of 31 m²/g.

The results again show that heating the filter cake in the presence of water before drying substantially reduces the BET surface area of the product.

EXAMPLE 3

400 liters of demineralised water was cooled to 10° C. with stirring. 95 kg of silica having a mean particle size of 2.75 μm and a BET surface area of 740 m²/g were added to the water giving a slurry of pH 2.5. 7.5 kg of calcium hydroxide were added to the slurry over a period of 12 minutes, maintaining the pH at approximately 9 without allowing the pH to rise above 10. The temperature was maintained at approximately 10° C. without allowing it to rise above 15° C.

The ion-exchange silica was washed with demineralised water.

Part of the slurry was heated to 90° C. and maintained at that temperature for 5 minutes. This part of the slurry was then allowed to cool over a period of 12 hours to 50° C. before being spray dried. A second part was spray dried without a preliminary heat treatment. The BET surface area of the corrosion inhibiting particles produced by spray drying without heat treating according to the invention was 300 m²/g. The corrosion inhibiting particles produced by heat treating the slurry before spray drying reduced the BET surface area to 115 m²/g.

EXAMPLE 4

A slurry of calcium-exchanged silica was prepared substantially as described in Example 1. The silica used was supplied by Grace Chemicals Limited under the trade designation SP4 and had a BET surface area of 650 m²/g and a mean particle size of 4 μm.

The slurry was heated up to 100° C. over a period of 15 mins and then the slurry was maintained at this temperature. Samples of the slurry were removed (A) when the temperature reached 100° C., (B) after the slurry had been heat treated at 100° C. for one hour and (C) after the slurry had been heat treated at 100° C. for 4 hours. The samples were cooled and then spray dried. The BET surface areas of the three samples were as follows:
A = 87 m²/g,
B = 72 m²/g and
C = 53 m²/g These results show how the duration of the heat treatment affects the surface area of the product.

EXAMPLE 5

Batches of calcium exchanged silica were prepared having different BET surface areas. The corrosion inhibiting particles were all prepared using 11 g of Ca(OH)₂ per 100 g of pre-ground silica.

The batches of calcium-exchanged silica particles were subjected to a specially designed test in order to assess the releasability of the calcium ions. The test employed an Orion Research Microprocessor/Ionalyzer 901 using a calcium ion electrode and a single junction reference electrode with 4M KCl saturated with Ag+ solution. The apparatus was calibrated at 25° C. and the electrode pair placed in 200 cm³ of a 5% by weight aqueous solution of NaCl. 1 g of the calcium-exchanged silica particles to be tested were added to the NaCl solution. The test solution was continuously stirred and the concentration of the calcium ions in the solution measured after 10 minutes $(Ca^{2+})_{10}$. The releasability of the calcium ions in the calcium-exchanged silica particles is expressed in terms of the amount of calcium ions in solution after 10 minutes as a percentage of the total amount of calcium in the particles i.e.

$$\frac{(Ca^{2+})_{10}}{(Ca)_{Total}} \times 100$$

The results given in Table 1 indicate that the releasability of the calcium ion decreases with decreasing BET surface area.

TABLE 1

| BET surface area of calcium-exchanged silica particles (m²/g) | Releasability of the calcium ion $\frac{(Ca^{2+})_{10}}{(Ca)_{Total}} \times 100$ |
|---|---|
| 276 | 51.4 |
| 250 | 52.3 |
| 140 | 32.4 |
| 72 | 25.9 |
| 30 | 16.2 |

EXAMPLE 6

25 kg of calcium-exchanged silica was prepared substantially as described in Example 3 using a commercially available silica sold by Joseph Crosfield under the trade name Gasil 200. The particles had a calcium content of 5.4 percent by weight. After washing, part of the slurry containing the calcium-exchanged silica particles was spray-dried. A second part of the slurry was spray dried after being heated at 90° C. for 30 minutes and a third part of the slurry was spray-dried after being heated at 90° C. for 24 hours. The BET surface areas and calcium release rates, determined as indicated in Example 5, are given in Table 2. The results again show that the releaseability of the calcium ion decreases with decreasing BET surface area.

TABLE 2

| Duration of heat treatment of the slurry at 90° C. (hours) | BET surface area of calcium exchanged silica (m²/g) | Releasability of the calcium ion $\frac{(Ca^{2+})_{10}}{(Ca)_{Total}} \times 100$ |
|---|---|---|
| 0 | 287 | 60 |
| 0.5 | 31 | 14.8 |
| 24 | 12 | 4.3 |

EXAMPLE 7

Two batches of calcium exchanged silica particles were prepared, substantially as described in Example 1, one of which had a BET surface area of 30 m²/g and the other a BET surface area of 250 m²/g. The releasability of the calcium ion from the two batches, as determined in Example 5, was 16.2 for the 30 m²/g particles and 52.3 for the 250 m²/g material.

The calcium exchanged silica corrosion inhibitors were used to prepared two paints each of which had the following composition:

| Component | Amount (% wt) |
|---|---|
| Synolac 76W | 34.30 |
| Thixomen | 0.30 |
| Iron Oxide | 8.84 |
| Microdol Extra | 7.26 |
| Barytes | 19.70 |
| Whiting | 2.76 |
| Ca/Silica Corrosion Inhibitor | 12.10 |
| White Spirit | 13.60 |
| Soya Lecithin | 0.52 |
| Lead naphthanate (24%) | 0.42 |
| Cobalt Octoate (10%) | 0.10 |
| Methyl ethyl ketoxime | 0.10 |
| | 100.00 |

The composition had a calculated pigment volume concentration of 47%, a volume solids of 50% and a density of 1.39 ml/g.

Synolac 76W (SYNOLAC is a registered trade mark) is a long oil alkyd solution in white spirit sold by Cray Valley Products Limited. Thixomen is a thickening agent sold by ICI. Microdol Extra (MICRODOL is a registered trade mark) is a micronised talc sold by A/S Norwegian Talc. Soya Lecithin is a pigment dispersant sold by BOCM Silcox.

The paints were prepared by milling all of the components except the iron oxide in a ball mill for 16 hours. The iron oxide was then blended into the paint composition in an Eiger horizontal bead mill.

The paints were applied, by spin coating, on to degreased, polished mild steel panels (ex Pyrene Chemical Services Limited) and cured for 7 days at ambient temperature (about 20° C.). The coated panels were then scratched through to the bare metal and subjected to the ASTM B117-73 salt spray test for 350 hours and rusting evaluated according to ASTM 610-68 before and after removing the paint film.

The panels coated with the paint prepared from the calcium exchanged silica corrosion inhibitor having a BET surface area of 30 m²/g showed less blistering of the coating, less rust and less creep, i.e. underfilm rust around the scratch, compared with the panels coated with the paint containing the high surface area corrosion inhibitor. By comparing the results of panels coated with various thicknesses of the two paints it was found that the film thickness of the coating containing the high surface area corrosion inhibitor needed to be 20–25 per cent thicker than the coating containing the corrosion inhibitor with a BET surface area of 30 m²/g in order to achieve the same level of performance.

We claim:

1. A process for producing corrosion inhibiting particles comprising binding corrosion inhibiting cations by ion-exchange to particles of silica or alumina to form cation exchanged particles, the cations of which are releaseable by further ion-exchange characterised in that the BET surface area of the cation-exchanged particles is reduced by subjecting the cation-exchanged particles to a heat treatment which comprises heating the particles at a temperature of from 50° to 120° C. while maintaining the water content of the particles at more than 15% by weight, followed by heating with removal of water to dry the particles.

2. A process as claimed in claim 1 wherein the silica or alumina particles have a BET surface area before ion-exchange of at least 500m²/g and the BET surface area of the cation-exchanged particles is reduced to less than 150m²/g.

3. A process as claimed in claim 1 or claim 2 wherein the heat treatment comprises heating a slurry of the cation exchanged particles in water prior to drying the particles.

4. A process as claimed in claim 3 wherein the particles are dried by spray drying.

5. A process as claimed in claim 1 or claim 2 wherein the heat treatment comprises heating a filter cake in a oven without removal of water vapour followed by a drying stage which comprises heating with removal of water vapour from the oven.

6. A process as claimed in claim 5 wherein the filter cake has a water content of from 40 to 60% by weight.

7. A process as claimed in claim 1 or claim 2 wherein the cation-exchanged particles are silica particles having calcium ions bond to the surface of the silica by ion-exchange.

8. A process as claimed in claim 1 or claim 2 wherein the heat treatment is carried out at a temperature of from 80° to 95° C.

9. A process as claimed in claim 1 or claim 2 wherein the BET surface area of the cation-exchanged particles is reduced to less than 100m$^2$/g.

10. A process as claimed in claim 9 wherein the BET surface area is reduced to less than 50m$^2$/g.

* * * * *